United States Patent [19]

Hmida et al.

[11] Patent Number: 4,920,509
[45] Date of Patent: Apr. 24, 1990

[54] BINARY CALCULATION CIRCUIT

[75] Inventors: Hedi Hmida, Paris; Pierre Duhamel, Issy Les Moulineaux, both of France

[73] Assignee: Etat Francais, represente par le ministres Delegue des Postes et Telecommunications (Centre National d'Etudes des Telecommunications), Issy Les Moulineaux, France

[21] Appl. No.: 167,787

[22] Filed: Mar. 11, 1988

[30] Foreign Application Priority Data

Mar. 18, 1987 [FR] France .................................. 87 03758

[51] Int. Cl.$^5$ .............................................. G06F 7/50
[52] U.S. Cl. ...................................... 364/784; 364/786
[58] Field of Search ................ 364/784, 786; 307/471, 307/472

[56] References Cited

U.S. PATENT DOCUMENTS

| | | | |
|---|---|---|---|
| 3,767,906 | 10/1973 | Pryor | 364/786 X |
| 3,932,734 | 1/1976 | Parsons | 364/786 |
| 4,052,604 | 10/1977 | Maitland et al. | 364/786 |
| 4,071,905 | 1/1978 | Oguchi et al. | 364/784 |
| 4,369,500 | 1/1983 | Fette | 364/786 X |
| 4,471,454 | 9/1984 | Dearden et al. | 364/786 |
| 4,485,316 | 11/1984 | Nuzillat et al. | 364/784 X |
| 4,709,346 | 11/1987 | Henlin | 364/784 |
| 4,713,790 | 12/1987 | Kloker et al. | 364/784 |
| 4,739,503 | 4/1988 | Armer et al. | 364/786 |

FOREIGN PATENT DOCUMENTS

| | | |
|---|---|---|
| 0096333 | 12/1983 | European Pat. Off. . |
| 0143456 | 6/1985 | European Pat. Off. . |
| 0185504 | 6/1986 | European Pat. Off. . |

OTHER PUBLICATIONS

IBM Technical Disclosure Bulletin, vol. 29, No. 6, Nov. 1986, p. 2549, "CMOS XDR".
Proceedings of the IEEE International Conference on Computer Design: VLSI in Computers (New York, Oct. 7–10, 1985), "Carry-Save Adders and Their Application for a Multiplication with Factored Multiplicands", by S. Steinlechner et al, pp. 359–362.
Patent Abstracts of Japan, vol. 9, No. 140, Logical Circuit, Masafumi Yamaguchi (Jun. 14, 1985).
International Journal of Mini & Microcomputers, "Bit Serial Techniques in VLSI Parallel Processing", by D. I. Moldovan et al, vol. 7, No. 2, 1985, pp. 49–52.

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

A circuit for performing binary calculation, the circuit being of the type having at least one cell possessing: a first bit input (Ai), a second bit input (Bi), a carry-in input (Ri-1), circuitry (1600) for generating a two input bit exclusive-OR signal (Ai⊕Bi) and its complement $\overline{(Ai \oplus Bi)}$, circuitry (1800) for producing a result signal, and circuitry (1900) for producing a carry-out signal (Ri), the circuitry being constituted by multiplexed logic. The complemented two input bit exclusive-OR signal (Ai⊕Bi) is produced by inverting the two input bit exclusive-OR signal (Ai⊕Bi), thereby making it possible to utilize only 15 transistors in the most cut-down version of the circuit. The invention also relates to a circuit (20) having an addition cell (22) calculating the sum of the input bits and a subtraction cell (24) calculating the difference of the input bits. The circuitry (1600) for producing the two input bit exclusive-OR signal (Ai⊕Bi) and its complement $\overline{(Ai \oplus Bi)}$ are then used in common both by the addition cell (22) and by the subtraction cell (24).

12 Claims, 11 Drawing Sheets

BINARY CALCULATION CIRCUIT

The present invention relates to a binary calculation circuit, and more precisely to a circuit for calculating the sum and/or the difference of two binary digits or bits. It is applicable to making binary electronic systems such as adders, multipliers, dividers, accumulators, etc.

BACKGROUND OF THE INVENTION

The elementary cell for such circuits is the adding cell or adder. In "Principles of CMOS VLSI Design" by N. H. E. Weste and Kamran Eshraghian published by Addison-Wesley Publishing Company, pp. 317–319, a full one-bit adder is described having three inputs: i.e. two operand inputs and one carry-in input. FIG. 1 shows such an adder. The adder has a first bit input (Ai), a second bit input (Bi) and a carry-in input (Ri-1 S). The adder produces a result signal (Si) and a carry-out signal (Ri S) using four inverting gates I1, I2, ..., two exclusive-OR gates XOR1 and XOR2, and four transmission gates C1, C2, .... Each inverting gate I changes the logic state of the signal applied to its input. The exclusive-OR gate XOR1 calculates the two input bit exclusive-OR signal (Ai⊕Bi) and the exclusive-OR gate XOR2 calculates the complemented two input bit exclusive-OR signal $\overline{(Ai \oplus Bi)}$. The transmission gates C1 and C2 calculate the carry-out signal (Ri S) and the transmission gates C3 and C4 calculate the result signal (Si). The various gates are constituted by one or more pairs of transistors T made of complementary MOS technology, i.e. having opposite polarities. The transistors are connected depending on the logical property of the gate in which they are included. As a result the adder comprises 24 transistors.

This adder is unsatisfactory in that it includes a large number of transistors.

The object of the present invention is to reduce the number of transistors in a full adder. To this end, it provides an adding cell which uses only 15 transistors in its most stripped-down version.

SUMMARY OF THE INVENTION

In brief, this object is achieved by using only one exclusive-OR gate (XOR) calculating the two input bit exclusive-OR signal (Ai⊕Bi) and then inverting this signal in order to produce the complemented two input bit exclusive-OR signal $\overline{(Ai \oplus Bi)}$, (or vice versa).

More fully, the invention provides a binary calculation circuit of the type comprising at least one cell having:

a first bit input for receiving a first bit input signal (Ai);

a second bit input for receiving a second bit input signal (Bi);

a carry-in bit input for receiving a carry-in bit input signal (Ri-1);

first means for generating a two input bit exclusive-OR signal (Ai⊕Bi) and its complement $\overline{(Ai \oplus Bi)}$;

second means for producing a result signal by performing an exclusive-OR function between the carry-in (Ri-1) and the two input bit exclusive-OR signal (Ai⊕Bi) and its complement $\overline{(Ai \oplus Bi)}$;

third means for producing a carry-out signal (Ri) by performing a transmission function by means of two transmission gates controlled by the two input bit exclusive-OR signal (Ai⊕Bi) and its complement $\overline{(Ai \oplus Bi)}$, with one of the gates passing the carry-in signal (Ri-1) and the other of the gates passing one or other of the two input signals (Ai, Bi).

According to an important feature of the invention, the complemented two input bit exclusive-OR signal $\overline{(Ai \oplus Bi)}$ is produced by inverting the two input bit exclusive-OR signal (Ai⊕Bi).

In a preferred embodiment of the circuit of the invention, the first means comprise three pairs of transistors as follows: a first pair of opposite polarity transistors comprising a first transistor and a second transistor, the gate of each of the transistors in the first pair being connected to the first bit input (Ai), a positive electric voltage being applied to the source of the first transistor, ground being applied to the source of the second transistor, and the drain of the first transistor and the drain of the second transistor being connected to a first node; a second pair of opposite polarity transistors comprising a first transistor and a second transistor, the source of the first transistor being connected to the first bit input (Ai), and the source of the second transistor being connected to said first node, the gate of each of the transistors in the second pair being connected to the second bit input (Bi), and the drain of the first transistor and the drain of the second transistor being connected to a second node; and a third pair of opposite polarity transistors comprising a first transistor and a second transistor, the drain of the first transistor and the source of the second transistor being connected to said second node, the source of the first transistor and the drain of the second transistor being connected to the second bit input (Bi), the gate of the first transistor being connected to the first bit input (Ai), and the gate of the second transistor being connected to said first node, with the two input bit exclusiveOR signal (Ai⊕Bi) being obtained at said second node.

According to another feature of the invention, in order to invert the two input bit exclusive-OR signal (Ai⊕Bi), said first means further comprise a fourth pair of opposite polarity transistors comprising a first transistor and a second transistor, the gate of each of the transistors in the fourth pair being connected to the two input bit exclusive-OR signal (Ai⊕Bi), a positive electric voltage being applied to the source of the first transistor, ground being applied to the source of the second transistor, and the drain of the first transistor being connected to the drain of the second transistor at a node at which the complemented two input bit exclusive-OR signal $\overline{(Ai \oplus Bi)}$ is obtained.

According to another preferred embodiment of the circuit of the invention, the first means comprise first and second pairs of transistors together with a single transistor, as follows: a first pair of same polarity transistors, comprising a first transistor and a second transistor, the gate of the first transistor being connected to the first bit input (Ai), the gate of the second transistor being connected to the second bit input (Bi), a positive electric voltage being applied to the source of the first transistor, the drain of the first transistor being connected to the source of the second transistor, and the drain of the second transistor being connected to a third node; a second pair of same polarity transistors having opposite polarity to the transistors of the first pair, and comprising a first transistor and a second transistor, the drain of the first transistor being connected to the first bit input (Ai), the gate of the first transistor being connected to the second bit input (Bi), the drain of the second transistor being connected to the second bit input (Bi), the gate of the second transistor being connected to the first bit input (Ai), and the source of each of the transistors being connected to said third node; a single transistor having its source connected to a positive electric voltage, its gate connected to the two input bit exclusive-OR signal (Ai⊕Bi), and its drain connected to said third node at which the complemented two input bit exclusive-OR signal $\overline{(Ai \oplus Bi)}$ is obtained.

According to another characteristic of the invention, in order to invert the two input bit exclusive-OR signal (Ai⊕Bi), the first means further comprise a pair of opposite polarity transistors comprising a first transistor and a second transistor, the gate of each of the transistors being connected to the complemented two input bit exclusive-OR signal $\overline{(Ai \oplus Bi)}$, a positive electric voltage being applied to the source of the first transistor, ground being applied to the source of the second transistor, and the drain of the first transistor being connected to the drain of the second transistor at a node at which the two input bit exclusive-OR signal $\overline{(Ai \oplus Bi)}$ is obtained.

In another aspect of the invention, to produce the sum signal (Si) of the three input bits (Ai), (Bi), and (Ri-1), the second means calculate the modulo sum of the first bit (Ai), the second bit (Bi), and the carry-in bit (Ri-1).

In another aspect of the invention, to produce the difference signal (Di) of the three input bits (Ai), (Bi), and (Ri-1), the second means calculate the complement of the modulo sum of the first bit (Ai), the second bit (Bi), and the carry-in bit (Ri-1).

According to another characteristic of the invention, to produce the carry-out signal (Ri) associated with the result signal obtained by performing calculation on the three input bits (Ai), (Bi), and (Ri-1), the third means calculate the sum of the products of: the two input bits (Ai) and (Bi); the second input bit (Bi) and the carry-in bit (Ri-1); and the carry-in bit (Ri-1) and the first input bit (Ai); said sum signal constituting the carry-out bit (Ri).

According to another preferred embodiment of the circuit of the invention, the second means comprise two pairs of opposite polarity transistors as follows: a first pair of transistors comprising a first transistor and a second transistor, with the gate of each of the transistors being connected to the carry-in input (Ri-1), the drain of the first transistor being connected to the two input bit exclusive-OR signal (Ai⊕Bi), the source of the second transistor being connected to the complemented two input bit exclusive-OR signal $\overline{(Ai \oplus Bi)}$, and the source of the first transistor being connected to the drain of the second transistor at a fourth node at which the result signal is obtained; and a second pair of opposite polarity transistors comprising a first transistor and a second transistor, with the drain of each of the transistors being connected to the carry-in input (Ri-1), the grid of the first transistor being connected to the two input bit exclusive-OR signal (Ai⊕Bi) and the grid of the second transistor being connected to the complemented two input bit exclusive-OR signal $\overline{(Ai \oplus Bi)}$, and the source of each of the transistors being connected to said fourth node at which the result signal is obtained.

According to another preferred embodiment of the circuit of the invention, the third means comprise two pairs of opposite polarity transistors as follows: a first pair comprising a first transistor and a second transistor, the gate of the first transistor being connected to the two input bit exclusive-OR signal $\overline{(Ai \oplus Bi)}$ and the gate of the second transistor being connected to the complemented two input bit exclusive-OR signal (Ai⊕Bi), the source of the first transistor and the drain of the second transistor being connected to the carry-in signal (Ri-1), the drain of the first transistor and the source of the second transistor being connected to a fifth node at which the carry-out signal (Ri) is obtained; and a second pair of opposite polarity transistors comprising a first transistor and a second transistor, the gate of the first transistor being connected to the two input bit exclusive-OR signal (Ai⊕Bi) and the gate of the second transistor being connected to the complemented two input bit exclusive-OR signal $\overline{(Ai \oplus Bi)}$, the drain of the first transistor and the source of the second transistor being connected to the first bit input (Ai), and the source of the first transistor and the drain of the second transistor being connected to said fifth node at which the carry-out signal (Ri) is obtained.

The invention also provides a circuit having a plurality of cells connected in parallel and organized as a ripple-carry adder module. In this first variant of the invention, the first cell of a pair of adjacent cells has a non-complemented carry-in (Ri-1) and a complemented carry-out ($\overline{Ri}$), and the second cell of a pair of adjacent cells comprises a complemented carry-in ($\overline{Ri}$) and a non-complemented carry-out (Ri+1).

In a preferred embodiment of the multi-cell circuit in accordance with the first variant of the invention, the complemented carry-out signal ($\overline{Ri}$) from the first cell of two adjacent cells and the complemented carry-in signal ($\overline{Ri}$) to the second cell of two adjacent cells are obtained by respective pairs of opposite polarity transistors connected as inverters, as follows: first and second opposite polarity transistors with the gate of each of the transistors connected to the carry-out signal (Ri) of the first cell, a positive electric voltage being applied to the drain of the first transistor, ground being applied to the drain of the second transistor, and the source of the first transistor and the source of the second transistor being interconnected at a node at which the complemented carry-out signal ($\overline{Ri}$) of the first cell is obtained; and first and second opposite polarity transistors with the gate of each of the transistors connected to the carry-in signal (Ri) of the second cell, a positive electric voltage being applied to the source of the first transistor, ground being applied to the source of the second transistor, and the drain of the first transistor and the drain of the second transistor being interconnected at a node at which the complemented carry-in signal ($\overline{Ri}$) of the second cell is obtained.

The invention also provides a circuit for performing calculations on n-bit binary words in which the bits are presented sequentially in series to the inputs of the cell. In this second variant of the invention, the cell further includes fourth means for storing the carry-out bit (Ri).

In an embodiment of this second variant of the invention, the fourth means comprise a D-type bistable, with the carry-out output (Ri) being connected to the data input of the bistable and the carry-in input (Ri-1) being connected to the data output from the bistable.

The invention also relates to a circuit for simultaneously calculating the sum (Si) and the difference (Di) of the input bits.

According to a very important characteristic of this third variant of the invention, the circuit comprises an addition cell calculating the sum (Si) of the three input bits (Ai), (Bi), and (Ri-1), and a subtraction cell calculating the difference (Di) of the three input bits (Ai), (Bi), and (Ri-1), with the first means producing the two input bit exclusive-OR signal $(\overline{Ai \oplus Bi})$ and its complement $(Ai \oplus Bi)$ being used in common both by the addition cell and by the subtraction cell.

According to an aspect of this third variant of the invention, the circuit is arranged as ripple-carry adder-subtractor modules.

According to another aspect of the third variant of the invention, the circuit is organized as adder-subtractor modules to which the input bits are presented sequentially in series to the inputs of the cells.

The invention also provides a circuit comprising a plurality of cells in parallel. According to a characteristic of the fourth variant of the invention, the circuit is organized as adder and/or subtractor modules having look-ahead carry.

BRIEF DESCRIPTION OF THE DRAWINGS

Embodiments of the invention are described by way of example with reference to the accompanying drawings in which.

In numerous respects, the accompanying drawings include information which is definitive in nature. Consequently, they may be used not only for facilitating understanding of the following detailed description, but also for contributing to the definition of the invention, where appropriate.

DESCRIPTION OF PREFERRED EMBODIMENTS

Figure 1:
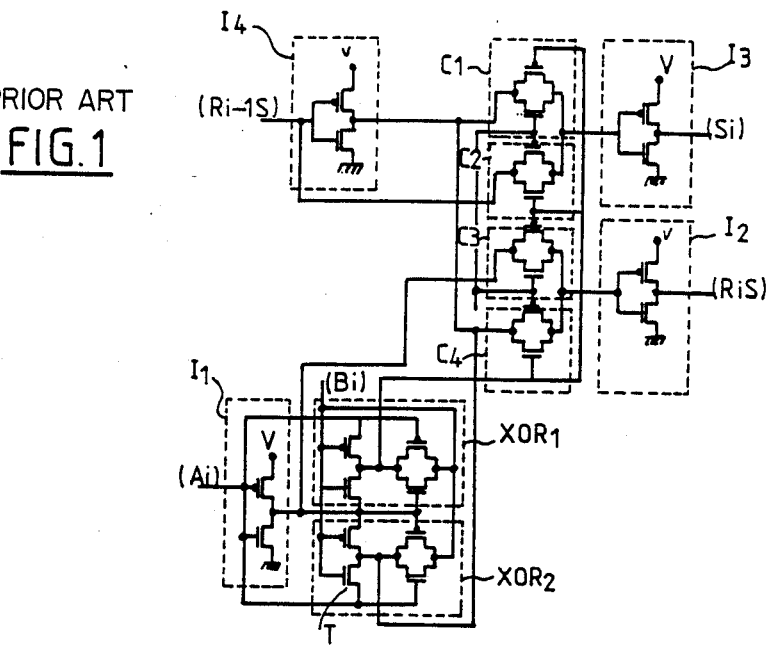
FIG. 1, already mentioned above, is a circuit diagram of a prior art one-bit full adder having three inputs (Ai), (Bi), and (Ri-1 S)
Figure 2:
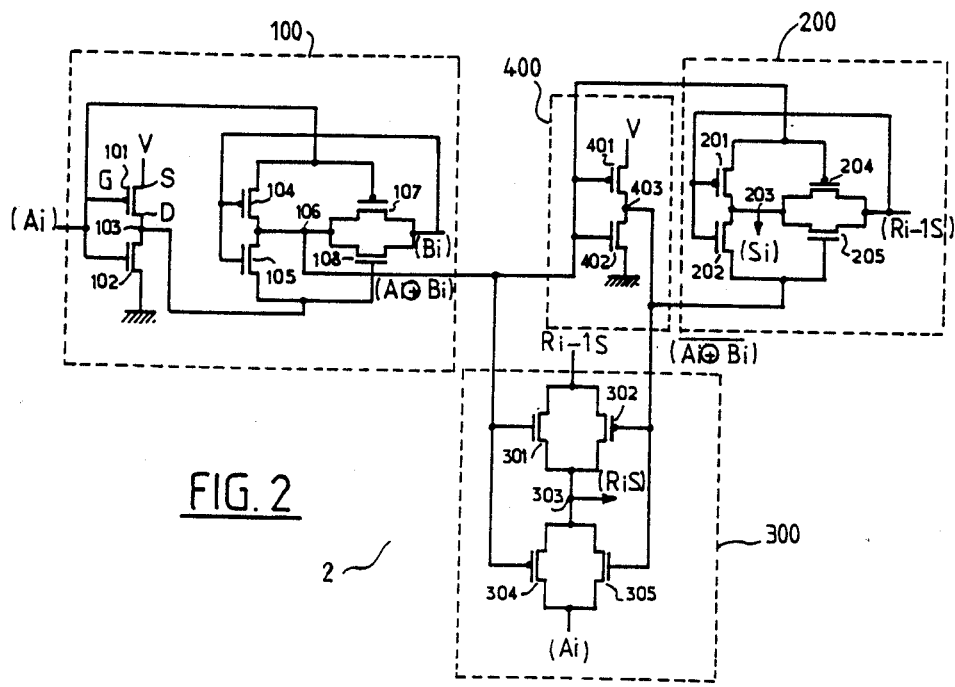
FIG. 2 is a circuit diagram of a one-bit full adder in accordance with the invention, having three inputs (Ai), (Bi), and (Ri-1 S) and using 16 transistors.

Reference is made to FIG. 2 which is a circuit diagram of a full adder in accordance with the invention having three one-bit inputs and comprising 16 transistors.

The adder 2 has a first bit input (Ai), a second bit input (Bi), and a carry-in bit input (Ri-1 S). The adder 2 produces a result bit signal (Si). The result is the sum of the two bits (Ai, Bi). It is obtained by calculating the modulo sum, also known as the exclusive-OR sum, of the first bit (Ai), the second bit (Bi), and the carry-in bit (Ri-1 S).

The adder 2 produces a carry-out bit signal (Ri S) which is associated with the result of calculating the sum (Si) of the three input bits (Ai), (Bi), and (Ri-1 S). The carry-out signal (Ri S) is obtained by calculating the sum of the product of the two input bits, the product of one of the input bits by the carry-in bit (Ri-1 S), and the product of the other input bit by the carry-in bit (Ri-1 S).

In order to obtain these two signals, the adder 2 comprises first means 100 for generating an exclusive-OR signal on the two input bits $(Ai \oplus Bi)$. These first means 100 comprise a pair of MOS technology complementary transistors 101 and 102. The transistor 101 is a P-channel transistor while the transistor 102 is an N-channel transistor. The gate G of each of the transistors 101 and 102 is connected to the first bit input (Ai). A positive electric voltage V is applied to the source S of the transistor 101. The value of the voltage V may be 5 volts, for example, when using MOS technology transistors. Ground is applied to the source S of the transistor 102. The drain D of the transistor 101 and the drain of the transistor 102 are interconnected at a first node 103.

The first means 100 further include a second pair of MOS technology complementary transistors 104 and 105. Transistor 104 is P-channel and transistor 105 is N-channel. The source of transistor 104 is connected to the first bit input (Ai) and the source of transistor 105 is connected to the first node 103. The gate of each of the transistors 104 and 105 is connected to the second bit input (Bi). The drain of transistor 104 and the drain of transistor 105 are interconnected at a second node 106.

Finally, the first mans 100 also include a third pair of complementary transistors 107 and 108. Transistor 107 is P-channel and transistor 108 is N-channel. The sources of transistors 107 and 108 are connected to the second node 106. The source of transistor 107 and the drain of transistor 108 are connected to the second bit input (Bi). The gate of transistor 107 is connected to the first bit input (Ai) and the gate of transistor 108 is connected to the first node 103. The two input bit exclusive-OR signal $(Ai \oplus Bi)$ is obtained at the second node 106.

The first means 100 operate as follows:

When the first bit signal (Ai) is at a positive electric voltage V corresponding to a high logic state, transistor 101 is OFF whereas the transistor 102 is ON. In this configuration, a zero voltage is obtained at node 103, corresponding to a low logic state.

When the first bit signal (Ai) is a zero voltage, transistor 101 is ON while transistor 102 is OFF. In this case a positive electric voltage is obtained at node 103. The pair of transistors 101 and 102 acts as an inverter on the first bit input signal (Ai).

When the first bit signal (Ai) is in the high logic state, the complemented signal (Ai) is in the low logic state. The pair of transistors 104 and 105 also acts as an inverter, thus causing the complemented signal (Bi) to appear at the second node 106. The transmission gate constituted by the pair of transistors 107 and 108 is open.

When the first bit signal (Ai) is in the low logic state, the complemented signal (Ai) is in the high logic state. The transmission gate constituted by the pair of transistors 107 and 108 is now closed, thus causing the signal (Bi) to pass to node 106. The pair of transistors 104 and 105 is inactive. As a result the two input bit exclusive-OR signal (Ai⊕Bi) is obtained at node 106.

The adder then comprises a pair 400 of opposite polarity transistors. This pair 400 receives the two input bit exclusive-OR signal (Ai⊕Bi) delivered by the first means 100 and inverts it. The first means 100 followed by the pair 400 thus constitutes a module delivering both the two input bit exclusive-OR signal (Ai⊕Bi) and the its complement (Ai⊕Bi). The transistor pair 400 comprises a P-channel transistor 401 and an N-channel transistor 402. The gate of each of the transistors 401 and 402 is connected to the exclusive-OR signal of the two input bits (Ai⊕Bi). An electric voltage V is applied to the source of transistor 401. When using MOS technology transistors, the value of V may be 5 volts, for example. Ground is applied to the source of transistor 402. The complemented two input bit exclusive-OR signal (Ai⊕Bi) is obtained at node 403 connecting the drain of transistor 401 to the drain of transistor 402. The pair of transistors 401 and 402 operates in the same way as the above-described pair of transistors 101 and 102.

The adder 2 then comprises second means 200 for producing a result signal (Si) by performing an exclusive-OR function on the carry-on bit (Ri-1 S) with the two input bit exclusive-OR signal (Ai⊕Bi) and its complement (Ai⊕Bi). The second means 200 comprise two pairs of opposite polarity transistors. The first pair is constituted by transistors 201 and 202.

Transistor 201 is P-channel and transistor 202 is N-channel. The gate of each of the transistors 201 and 202 is connected to the carry-in bit input (Ri-1 S). The source of transistor 201 is connected to the two input bit exclusive-OR signal (Ai⊕Bi). The source of transistor 202 is connected to the complemented two input bit exclusive-OR signal (Ai⊕Bi). The result signal (Si) is obtained at a node 203 interconnecting the drain of transistor 201 and the drain of transistor 202.

The second pair is constituted by transistors 204 and 205. Transistor 204 is P-channel and transistor 205 is N-channel. The source of transistor 204 and the drain of transistor 205 is connected to the carry-in bit (Ri-1 S). The gate of transistor 204 is connected to the two input bit exclusive-OR signal (Ai⊕Bi). The gate of transistor 205 is connected to the complemented two input bit exclusive-OR signal (Ai⊕Bi). The result signal (Si) is obtained at the node 203 which also interconnected the sources of the transistors 204 and 205.

The second means 200 operate as follows:

When the two input bit exclusive-OR signal (Ai⊕Bi) is in the high logic state, its complement (Ai⊕Bi) is in the low logic state. The transistors 201 and 202 act as an inverter causing the complemented signal (Ri-1 S) at node 203. The transmission gate constituted by the pair of transistors 204 and 205 is open.

When the two input bit exclusive-OR signal (Ai⊕Bi) is in the low logic state, its complement (Ai⊕Bi) is in the high logic state. The transmission gate constituted by the pair of transistors 204 and 205 is now closed, thus causing the signal (Ri-1 S) to appear at node 203. The pair of transistors 201 and 202 is inactive.

The adder finally comprises third means 300 for producing a carry-out signal (Ri S) by means of a transmission function comprising two transmission gates controlled by the two input bit exclusive-OR signal (Ai⊕Bi) and its complement (Ai⊕Bi), with one of the gates passing the carry-in signal (Ri-1 S) and with the other of the gates passing one or other of the two input bit signals (Ai, Bi).

The third means 200 comprise two pairs of opposite polarity transistors. The first pair is constituted by transistors 301 and 302. Transistor 301 is N-channel and transistor 302 is P-channel. The gate of transistor 301 is connected to two input bit exclusive-OR signal (Ai⊕Bi). The gate of transistor 302 is connected to complemented two input bit exclusive-OR signal (Ai⊕Bi). The drain of transistor 301 and the source of transistor 302 are connected to the carry-in signal (Ri-1 S). The carry-out signal (Ri S) is obtained at the node 303 interconnecting the source of transistor 301 and the drain of transistor 302. The second pair is constituted by transistors 304 and 305. Transistor 304 is P-channel and transistor 305 is N-channel.

The gate of transistor 304 is connected to the two input bit exclusive-OR signal (Ai⊕Bi). The gate of transistor 305 is connected to the complemented two input bit exclusive-OR signal (Ai⊕Bi). The drain of transistor 304 and the source of transistor 305 is connected to the first input bit (Ai). The carry-out signal (Ri S) is obtained from node 303 interconnecting the source of transistor 304 and the drain of transistor 305.

The third means (300) operate as follows:

When the two input bit exclusive-OR signal (Ai⊕Bi) is in the high logic state, its complement (Ai⊕Bi) is in the low state. The transmission gate constituted by transistors 301 and 302 is closed, causing signal (Ri-1 S) to appear at node 303. The transmission gate constituted by the pair of transistors 304 and 305 is inactive.

When the two input bit exclusive-OR signal (Ai⊕Bi) is in the low logic state, its complement (Ai⊕Bi) is in the high state. The transmission gate constituted by transistors 304 and 305 is now closed, thus causing the signal (Ai) to appear at node 303. The pair of transistors 301 and 302 is inactive.

Figure 3:
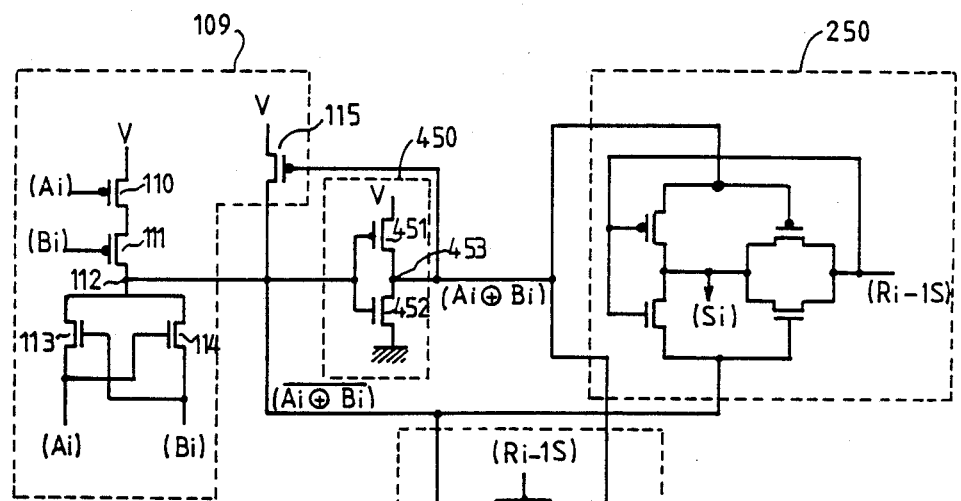
FIG. 3 is a circuit diagram of a one-bit full adder in accordance with the invention, having three inputs (Ai), (Bi), and (Ri-1 S) and using 15 transistors.

Reference in now made to FIG. 3 which is the circuit diagram of a full adder in accordance with the invention, having three one-bit inputs and comprising 15 transistors.

In order to obtain an adder 4 having only 15 transistors, the first means 100 of the adder 2 described with reference to FIG. 2 are modified. The other means 250, 350, and the pair 450 of adder 4 are identical to the means 200, 300, and 400 respectively of adder 2 described with reference to FIG. 2.

The first means 109 of adder 4 comprise a pair of P-channel transistors 110 and 111. The gate of transistor 110 is connected to the first bit input (Ai) and the gate of transistor 111 is connected to the second bit input (Bi). An electric voltage V is applied to the source of transistor 110. When using MOS technology transistors, the value of V may be 5 volts, for example. The drain of transistor 110 is connected to the source of transistor 111. The drain of transistor 111 is connected to a node 112.

The first means 109 of adder 4 further include a pair of transistors constituted by an N-channel transistor 113 and an N-channel transistor 114. The drain of transistor 113 is connected to the first bit input (Ai). The gate of transistor 113 is connected to the second bit input (Bi). The drain of transistor 114 is connected to the second bit input (Bi). The gate of transistor 114 is connected to the first bit input (Ai). The complemented two input bit exclusive-OR signal $\overline{(Ai \oplus Bi)}$ is obtained at node 112 interconnecting the sources of the transistors 113 and 114.

The first means 109 of adder 4 finally include a P-channel transistor 115. The drain of transistor 115 is connected to node 112. An electric voltage V is applied to the source of transistor 115. The gate of transistor 115 is connected to node 453 of the pair 450 constituted by transistors 451 and 452.

The role of transistor 115 is as follows. When a high logic level is applied to the gate of an N-type transistor, its source-to-drain conduction of a low logic level is good while its source-to-drain conduction of a high logic level is poor. Thus, the transistors 113 and 114 of the means 109 conduct with loss when the signal Ai and Bi are both at a high logic level (Ai=Bi=1). In order to remedy this drawback, the transistor 115 applies the signal $\overline{(Ai \oplus Bi)}$ in the high state to node 112 when the signal $(Ai \oplus Bi)$ applied to its gate is at the low logic level (i.e. whenever Ai=Bi, regardless of whether they equal 0 or 1).

In order to reduce the number of transistors in a binary calculation circuit, one aspect of the invention lies in the following dispositions.

Firstly, the first means form a first two-input and one-output operator for producing the signal $(Ai \oplus Bi)$ from the two input bits (Ai, Bi), with said first operator being provided with an additional output for delivering one of the following complemented signals $\overline{(Ai)}$, $\overline{(Bi)}$, and $\overline{(Ai \oplus Bi)}$.

Secondly, the second means form a second two-input and one-output operator for producing a result signal on the basis of the carry-in signal (Ri-1) or its complement $\overline{(Ri-1)}$ and the signal $(Ai \oplus Bi)$ or its complement $\overline{(Ai \oplus Bi)}$ as delivered by the first means, with said second operator having at least one additional output on which one of its input signals is available.

Thirdly, of the signals (Ai), (Bi), $(Ai \oplus Bi)$, (Ri-1), and the complements thereof required for the operation of the third means which calculate the carry-out signal (Ri), at least two of them may be conveyed by the additional outputs from the first and second means, thereby making it possible to reduce the number of transistors.

Thus, the Applicants have observed that the additional output defined by node 112 of the means 109 may convey the signal $\overline{(Ai \oplus Bi)}$ to the third means 350. Similarly, the additional output defined by the node 453 from which the signal $(Ai \oplus Bi)$ is conveyed to one of the inputs of the second means 250 can convey the signal $(Ai \oplus Bi)$ to the third means 350.

Another characteristic of the invention is also to use the additional outputs provided in the first and second means for providing the signals required for calculating the carry-out signal (Ri). This characteristic is also described in the binary calculation circuits described below.

The invention also relates to a circuit comprising a plurality of cells connected in parallel and organized as a ripple carry adder module. Merely juxtaposing $\bar{n}$ adders as described with reference to FIGS. 2 and 3 is inappropriate since a set of transistors would then be interconnected in series thus forming a linear chain whose equivalent circuit is a network of RC cells. The propagation delay F to which the output signal is subjected compared with the input signal of such a circuit is very high.

A first variant of the circuit of the invention serves to remedy this drawback.

Figure 4:
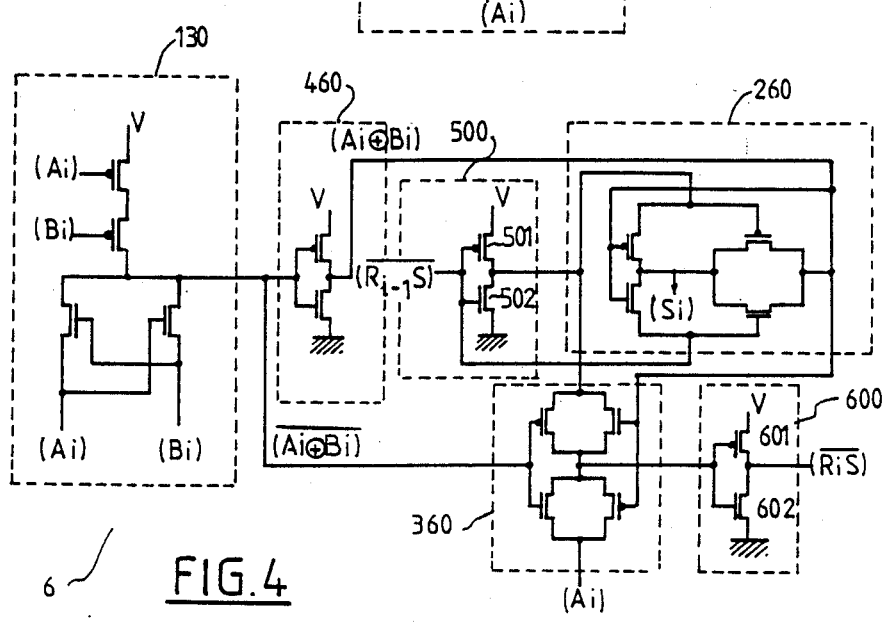
FIG. 4 is a circuit diagram of a one-bit ripple carry full adder in accordance with the invention, having three inputs (Ai), (Bi), and (Ri-1 S) and using 18 transistors.

Reference is now made to FIG. 4 which shows this first variant and which is a circuit diagram of a full one-bit adder 6 in accordance with the invention having three inputs with ripple carry and comprising 18 transistors.

Adder 6 is obtained by modifying adder 4 described with reference to FIG. 3 by including a transistor pair 500 at the carry-in input (Ri-1 S), said pair 500 being constituted by a P-channel transistor 501 and an N-channel transistor 502, and also by applying a transistor pair 600 comprising a P-channel transistor 601 and an N-channel transistor 602 to the carry-out signal (Ri S). The transistors 501 and 502 of the pair 500 and the transistors 601 and 602 of the pair 600 are connected so as to invert the carry-in signal (Ri-1 S) and the carry-out signal (Ri S) respectively in the same manner as the transistors 451 and 452 of the pair 450 described with reference to FIG. 3 for providing the complemented two input bit exclusive-OR signal $\overline{(Ai \oplus Bi)}$.

Transistor 115 of the first means 109 of adder 4 described with reference to FIG. 3 is omitted in the first means 130 of adder 6 described with reference to FIG. 4, since its function is now performed by the transistor pairs 500 and 600.

The other means 260, 360, and 460 of adder 6 are respectively identical to the means 250, 350, 450 of adder 5 described with reference to FIG. 3.

The carry-in signal (Ri-1 S) and the carry-out signal (Ri S) are respectively complemented by pair 500 and by pair 600.

The carries are complemented in order to reduce the carry propagation time through a multiple adder circuit.

Thus, the first adder of two adjacent adders in such a circuit comprises a carry-in (Ri-1 S) and a complemented carry-out $\overline{(Ri\,S)}$. The second adder of two adjacent adders comprises a complemented carry-in input $\overline{(Ri\,S)}$ and an uncomplemented carry-out signal (Ri+1 S). Such a circuit increases the propagation time of the carry solely by the time required for propagating the carry through one pair of transistors 500, unlike an adder constituted by two juxtaposed adders as described with reference to FIGS. 2 or 3.

Figure 5:
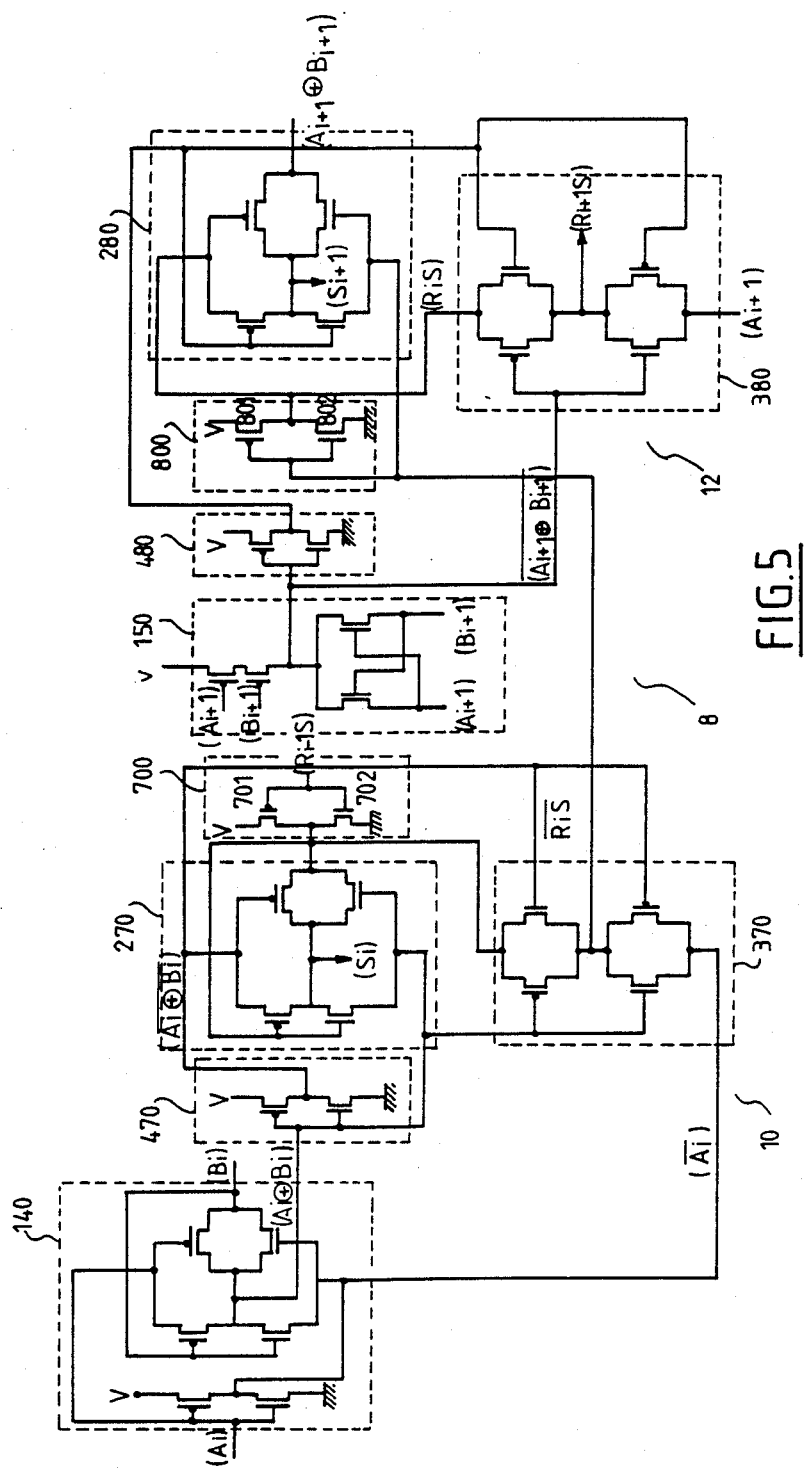
FIG. 5 is a circuit diagram of a two-bit ripple full adder in accordance with the invention and having 34 transistors.

Reference is now made to FIG. 5 which is a circuit diagram of a full two-bit adder in accordance with the invention, having ripple carry and comprising 34 transistors.

Adder 8 comprises an adder 10 as described with reference to FIG. 2 and an adder 12 as described with reference to FIG. 4.

The means 140, 470, 270, and 370 of adder 10 are respectively identical to the means 100, 400, 200, and 300 of adder 2 described with reference to FIG. 2.

The carry-in (Ri-1 S) to adder 10 is complemented by a pair 700 of transistors 701 and 702 connected in the same manner as the transistors 401 and 402 of the pair 400 described with reference to FIG. 2.

The means 150, 480, 280, and 380 are respectively identical to the means 130, 460, 260, and 360 of adder 6 described with reference to FIG. 4.

The carry-in (Ri S) to adder 12 is obtained by complementing the carry-out (Ri S) of adder 10 by means of a pair 800 of transistors 801 and 802 connected in the same manner as the pair 700.

In comparison with an adder constituted by two juxtaposed adders of the type described with reference to FIG. 4, adder 8 improves the carry propagation time by a period equal to one half of the propagation time of the carry through a pair 700

When producing an adder-subtractor cell which additionally includes a difference carry-in (Ri-1 D), a further exclusive OR function on the carry-in (Ri-1 D) and the two input bit exclusive-OR signal (Ai⊕Bi) and its complement $\overline{(Ai \oplus Bi)}$ also serves to calculate the complement of the modulo sum of the first bit (Ai), the second bit (Bi), and the carry-in (Ri-1 D). The resulting signal produced by this further exclusive-OR function is the difference (di) between the bits (Ai, Bi).

It may be observed that the two input bit exclusive-OR signal (Ai⊕Bi) and its complement $\overline{(Ai \oplus Bi)}$ are necessary for designing an electric circuit which provided both the sum (Si) and the difference (Di) of two bits. The two input bit exclusive-OR signal (Ai⊕Bi) therefore needs to be provided only once in order to perform both the addition operation and the subtraction operation on two bits.

Figure 6:
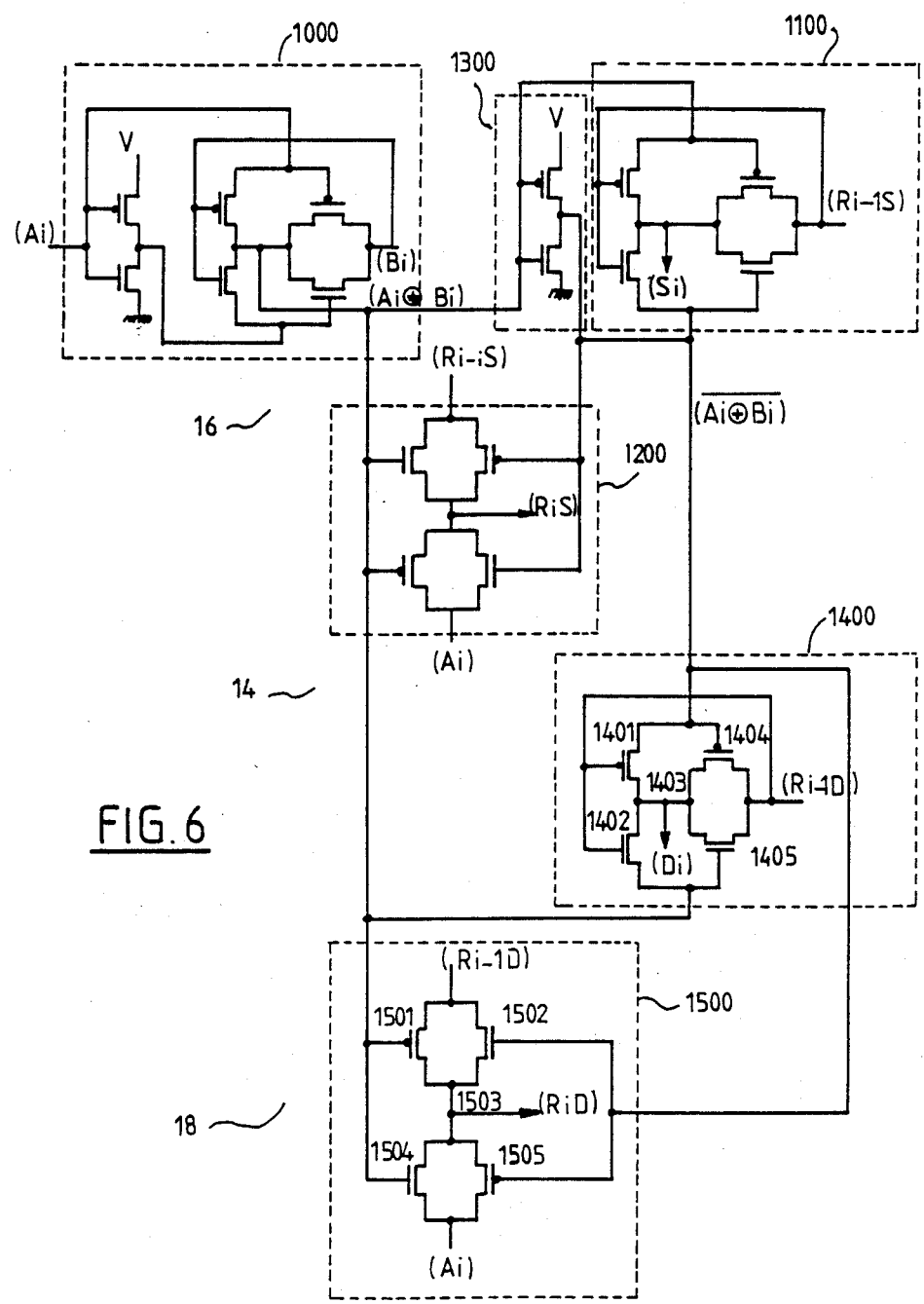
FIG. 6 is a circuit diagram of a one-bit full adder-subtractor in accordance with the invention having four inputs (Ai), (Bi), (Ri-1 S), and (Ri-1 D), and comprising 24 transistors.

Reference is now made to FIG. 6 which is a circuit diagram of a full one-bit adder-subtractor in accordance with the invention having four inputs (Ai), (Bi), (Ri-1 S), and (Ri-1 D), and comprising 24 transistors.

The adder-subtractor 14 comprises an adder 16 and a subtractor 18.

The adder 16 is identical to that described with reference to FIG. 2. It comprises a module 1000 calculating the two input bit exclusive-OR signal (Ai⊕Bi). The module 1000 is constituted by transistors connected in the same manner as the first means 100 described with reference to FIG. 2. The adder 16 further includes a module 1100 calculating the sum (Si) of the three input bits (Ai, Bi, and Ri-1 S). The module 1100 is constituted by transistors connected in the same manner as the second means 200 described with reference to FIG. 2. The adder 16 also includes a module 1200 calculating the carry-out (Ri S) associated with the sum of the three input bits (Ai, Bi, and Ri-1 S). The module 1200 is constituted by transistors connected in the same manner as the transistors of the third means 300 described with reference to FIG. 2. The adder 16 finally includes a pair 1300 of transistors which invert the two input bit exclusive-OR signal (Ai⊕Bi). The pair 1300 is constituted by two transistors connected in the same manner as the transistors in the pair 400 described with reference to FIG. 2.

The subtractor 18 comprises a module 1400 calculating the difference (di) between two input bits (Ai, Bi) and taking account of the carry-in (Ri-1 D), and a module 1500 calculating the carry-out (Ri D) associated with the difference between the two input bits (Ai, Bi).

The module 1400 comprises two pairs of opposite polarity transistors. The first pair comprises transistors 1401 and 1402. Transistor 1401 is P-channel and transistor 1402 is N-channel. The gate of each of the transistors 1401 and 1402 is connected to the carry-in input (Ri-1 D) associated with the difference between the two input bits (Ai, Bi). The source of transistor 1401 is connected to the complemented two input bit exclusive-OR signal $\overline{(Ai \oplus Bi)}$. The source of transistor 1402 is connected to the two input bit exclusive-OR signal (Ai⊕Bi). The result signal (di) is obtained at a node 1403 interconnecting the drain of transistor 1401 and the drain of transistor 1402.

The second pair is constituted by transistors 1404 and 1405. Transistor 1404 is P-channel and transistor 1405 is N-channel. The source of transistor 1404 and the drain of transistor 1405 is connected to the carry-in (Ri-1 D) associated with the difference between the two input bits. The gate of transistor 1404 is connected to the complemented two input bit exclusive-OR signal $\overline{(Ai \oplus Bi)}$. The gate of transistor 1405 is connected to the two input bit exclusive-OR signal (Ai⊕Bi). The result signal (Di) is obtained from the node 1403 interconnecting the drain of transistor 1404 and the source of transistor 1405.

The module 1500 comprises two pairs of opposite polarity transistors. The first pair is constituted by transistors 1501 and 1502. Transistor 1501 is P-channel and transistor 1502 is N-channel. The gate of transistor 1501 is connected to the two input bit exclusive-OR signal (Ai⊕Bi). The gate of transistor 1502 is connected to the complemented two input bit exclusive-OR signal $\overline{(Ai \oplus Bi)}$. The source of transistor 1501 and the drain of transistor 1502 are connected to the carry-in (Ri-1 D) associated with the difference between the two input bits. The carry-out signal (Ri D) associated with the difference between the two bits is obtained at node 1503 interconnecting the drain of transistor 1501 and the source of transistor 1502. The second pair is constituted by transistors 1504 and 1505. The transistor 1504 is N-channel and the transistor 1505 is P-channel. The gate of transistor 1504 is connected to the two input bit exclusive-OR signal $\overline{(Ai \oplus Bi)}$. The gate of transistor 1505 is connected to the complemented two input bit exclusive-OR signal (Ai⊕Bi). The sources of the transistors 1504 and 1505 are connected to the first input bit (Ai). The carry-out signal (Ri D) associated with the difference between the two input bits is obtained from the node 1503 interconnecting the drains of the transistors 1504 and 1505.

Figure 7:
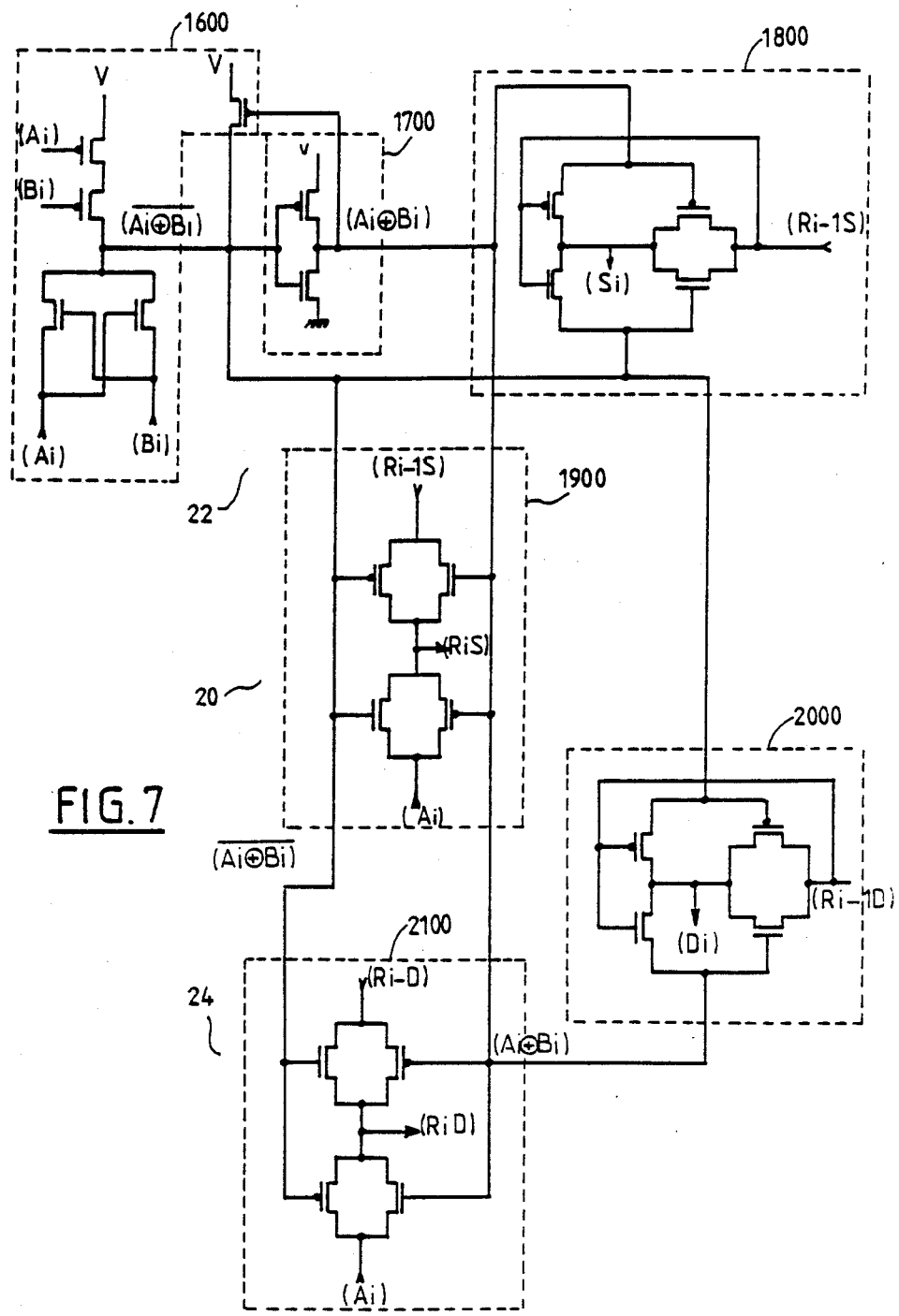
FIG. 7 is a circuit diagram of a one-bit full adder-subtractor in accordance with the invention having four inputs (Ai), (Bi), (Ri-1 S), and (Ri-1 D), and comprising 23 transistors.

Reference is now made to FIG. 7 which is a circuit diagram of a full one-bit adder-subtractor in accordance with the invention having four inputs (Ai), (Bi), (Ri-1 S), and (Ri-1 D), and comprising 23 transistors.

The adder-subtractor 20 comprises an adder 22 and a subtractor 24. The adder 22 is identical to the adder described with reference to FIG. 3. It comprises a module 1600 calculating the two input bit exclusive-OR signal (Ai⊕Bi). The module 1600 is constituted by transistors connected in the same manner as the first means described with reference to FIG. 3. The adder 22 also includes a module 1800 calculating the sum (Si) of the three input its (Ai), (Bi), and (Ri-1 S). The module 1800 is constituted by transistors connected in the same manner as the transistors of the second means described with reference to FIG. 2. Adder 22 also includes a module 1900 calculating the carry-out (Ri S) associated with the sum of the two input bits (Ai, Bi). The module 1900 is constituted by transistors connected in the same manner as the transistors of the third means 300 described with reference to FIG. 2. The adder 22 finally includes a module 1700 inverting the complemented two input bit exclusive-OR signal $\overline{(Ai \oplus Bi)}$ to produce the non-complemented two input bit exclusive-OR signal (Ai⊕Bi). The module 1700 comprises transistors connected in the same manner as the pair 450 described with reference to FIG. 3.

The subtractor 24 comprises a module 2000 calculating the difference (Di) between the two input bits (Ai, Bi) taking account of the carry-in (Ri-1 D), and a module 2100 calculating the carry-out (Ri D) associated with the difference between the two input bits (Ai, Bi). The transistors of the module 2000 are connected in the same manner as the transistors in the module 1400 described with reference to FIG. 6. The transistors of the module 2100 are connected in the same manner as the transistors of the module 1500 described with reference to FIG. 6.

Figure 8:
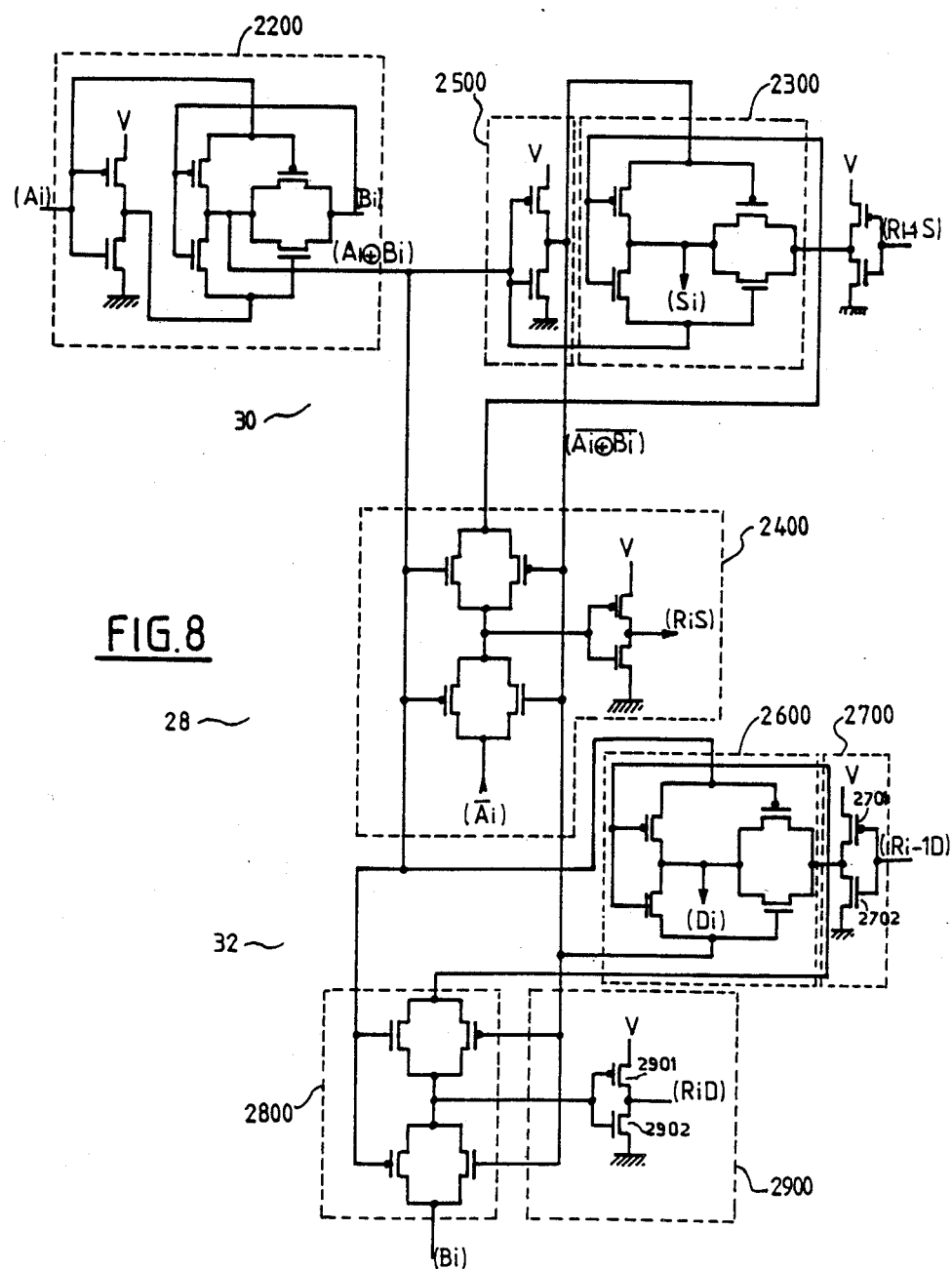
FIG. 8 is a circuit diagram of a one-bit full adder-subtractor in accordance with the invention having four inputs (Ai), (Bi), (Ri-1 S), and (Ri-1 D), and comprising 32 transistors.

Reference is now made to FIG. 8 which shows a full one-bit adder-subtractor in accordance with the invention having four inputs (Ai), (Bi), (Ri-1 S), and (Ri-1 D), comprising 32 transistors.

The adder-subtractor 28 comprises an adder 30 and a subtractor 32.

The adder 30 comprises a module 2200 calculating the two input bit exclusive-OR signal (Ai⊕Bi). The module 220 is identical to the first means 100 described with reference to FIG. 2. The adder 30 also includes a module 2300 calculating the sum (Si) of the two bits. The module 2300 is identical to the module calculating the sum (Si) of the two bits described with reference to FIG. 4. The adder 30 also includes a module 2400 calculating the carry-out (Ri S) associated with the sum of the three input bits (Ai), (Bi), and (Ri-1 S). The module 2400 is identical to the module 370 calculating the carry-out (Ri S) associated with the sum of the two input bits described with reference to FIG. 5. The adder 30 finally includes a module 2500 for inverting the two input bit exclusive-OR signal (Ai⊕Bi), thereby providing the complemented two input bit exclusive-OR signal $\overline{(Ai\oplus Bi)}$. The module 2500 is identical to the module 400 described with reference to FIG. 2.

The subtractor 32 comprises a module 2600 calculating the difference (Di) between the two input bits and the carry-in (Ri-1 D). The module 2600 is identical to the module 2000 calculating the difference (Di) of the two bits and the carry-in (Ri-1 D) described with reference to FIG. 7. The subtractor 32 also includes a module 2800 calculating the carry-out (Ri D) associated with the difference (Di) between the two bits. The module 2800 is identical to the module 2100 calculating the carry-out (Ri D) associated with the difference between the two input bits. A module 2700 constituted by a P-channel transistor 2710 and an N-channel transistor 2702 is added to the carry-in input (Ri-1 D) associated with the difference between the two input bits. Similarly, a module 2900 constituted by a P-channel transistor 2901 and an N-channel transistor 2902 is added to the carry-out signal (Ri D) associated with the difference between the two bits. The transistors 2701 and 2702 of the module 2700 and the transistors 2901 and 2902 of the module 2900 are connected so as to invert the carry-in signal (Ri-1 D) and the carry-out signal (Ri D) respectively.

Figure 9:
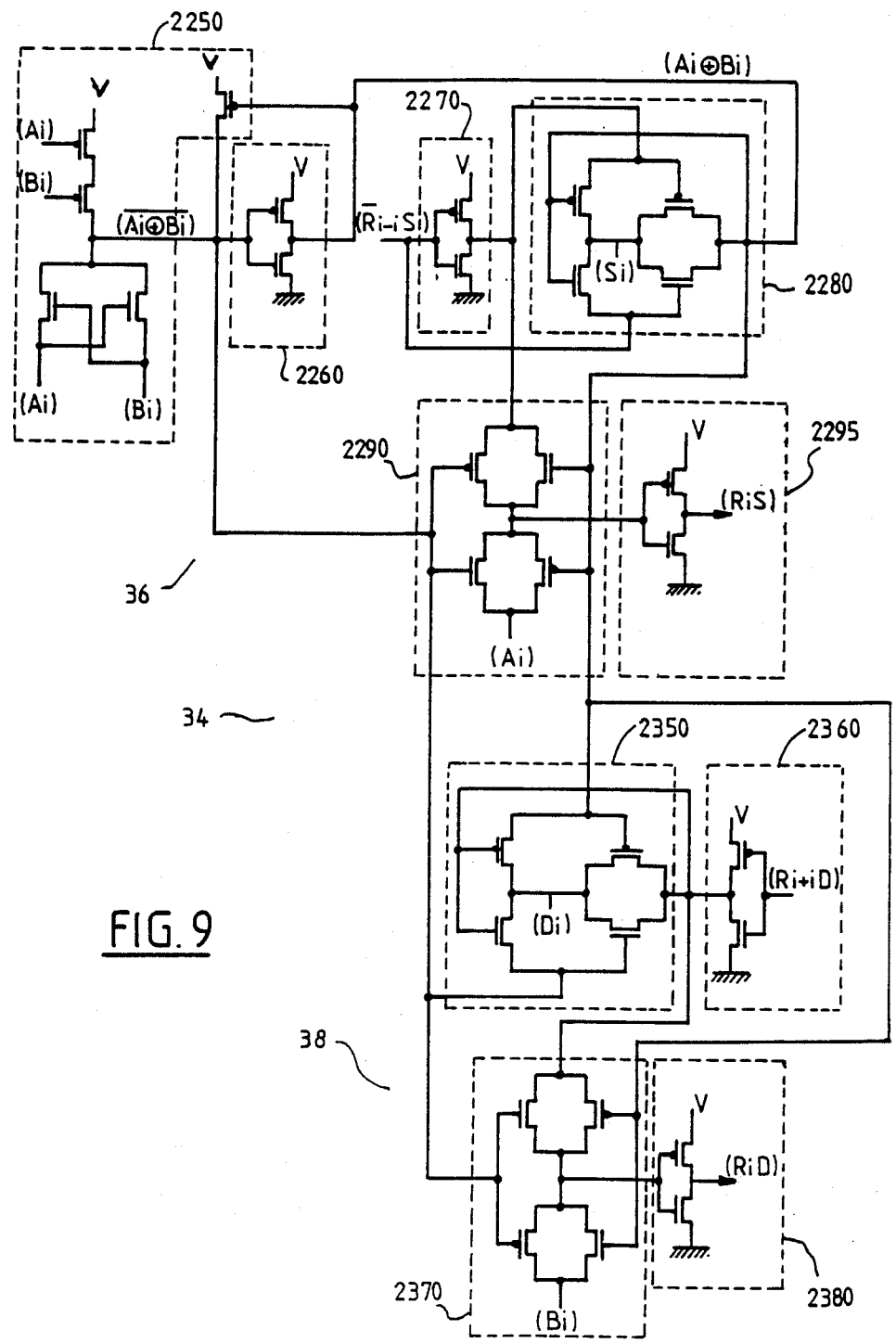
FIG. 9 is a circuit diagram of a one-bit full adder-subtractor in accordance with the invention having four inputs (Ai), (Bi), (Ri-1 S), and (Ri-1 D), and comprising 31 transistors.

Reference is now made to FIG. 9 which shows a full one-bit adder-subtractor in accordance with the invention having ripple carry and comprising 31 transistors.

The adder-subtractor 34 comprises an adder 36 and a subtractor 38. The means 2250, 2260, 2270, 2280, 2290, and 2295 are identical to the means 130, 460, 500, 260, 360, and 600, respectively, of the adder 6 described with reference to FIG. 4. The means 2350, 2360, 2370, and 2380 are identical with the means 2600, 2700, 2800, and 2900, respectively, of the subtractor 32 described with reference to FIG. 8. The adder 36 calculates the two input bit exclusive-OR signal (Ai⊕Bi) and its complement $\overline{(Ai\oplus Bi)}$. These two signals are used by the subtractor 38 to calculate the difference between the two bits and to calculate the carry (Ri D) associated with the difference between the two bits.

Figure 10:
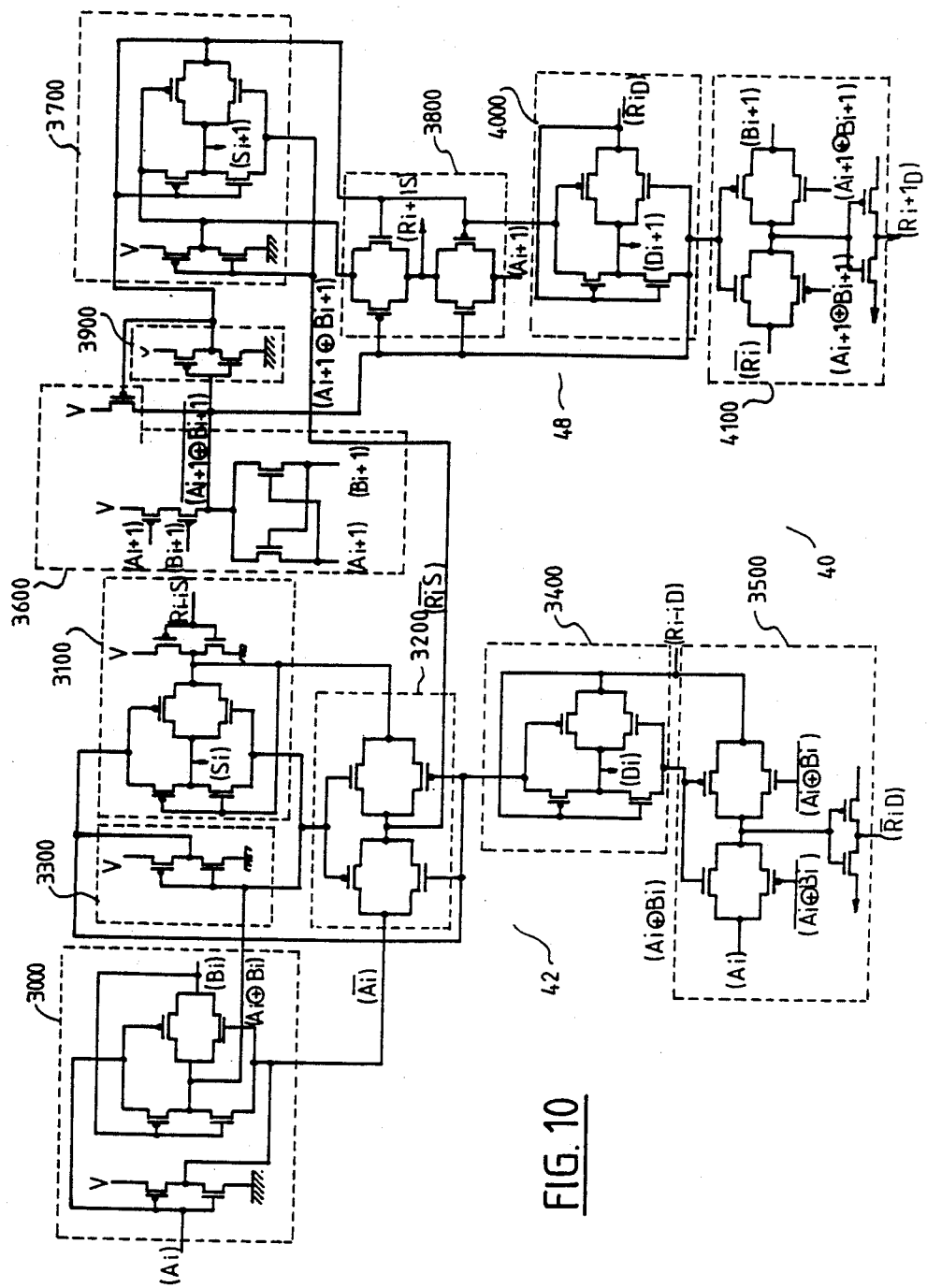
FIG. 10 is a circuit diagram of a two-bit full adder-subtractor comprising 55 transistors.

Reference is now made to FIG. 10 which shows a full two-bit adder-subtractor in accordance with the invention comprising 55 transistors.

The two-bit adder-subtractor 40 comprises a first one-bit adder-subtractor 42 and a second one-bit adder-subtractor 48. The adder-subtractor 42 is identical to the adder-subtractor described with reference to FIG. 8. It is constituted by a module 3000 calculating the two input bit exclusive-OR signal (Ai⊕Bi), a module 3100 calculating the sum of the two input bits and the carry-in bit (Ri-1 S), a module 3200 calculating the carry-out bit (Ri S) associated with the two bit sum, and a module 3300 inverting the two input bit exclusive-OR signal (Ai⊕Bi), thereby providing the complemented two input bit exclusive-OR signal $\overline{(Ai\oplus Bi)}$. The adder-subtractor 42 also includes a module 3400 calculating the two-bit difference (Di) and a module 3500 calculating the carry-out (Ri D) associated with the two-bit difference.

The adder-subtractor 48 is identical to the adder-subtractor described with reference to FIG. 9. The adder-subtractor 48 comprises a module 3600 calculating the exclusive OR $\overline{(Ai+1\oplus Bi+1)}$, a module 3700 calculating the sum (Si+1) of the two input bits (Ai+1) and (Bi+1) and the carry-in (Ri-S), a module 3800 calculating the carry-out (Ri+1 S) associated with the sum of the two input bits (Ai+1) and (Bi+1), and a module 3900 inverting the complemented two input bit exclusive-OR signal $\overline{(Ai\oplus Bi)}$, to obtain the two input bit exclusive-OR signal (Ai⊕Bi). The adder-subtractor 48 also includes a module 4000 calculating the difference (Di+1) between the two input bits and the carry-in (Ri D), and a module 4100 calculating the carry-out (Ri+1 D) associated with the difference between the two input bits (Ai+1) and (Bi+1).

The present invention also provides a binary calculation circuit where the digits on which calculations are to be performed are presented to the circuit sequentially in series, i.e. one after another. Each bit is sequentially shifted into the circuit under the control of clock pulses, beginning with the least significant bits. In order to store the carry-out associated with the binary calculation, a D-type bistable is used whose operation is likewise controlled by the clock. Problems associated with carry propagation through the D-type bistable are thus avoided.

Figure 11:
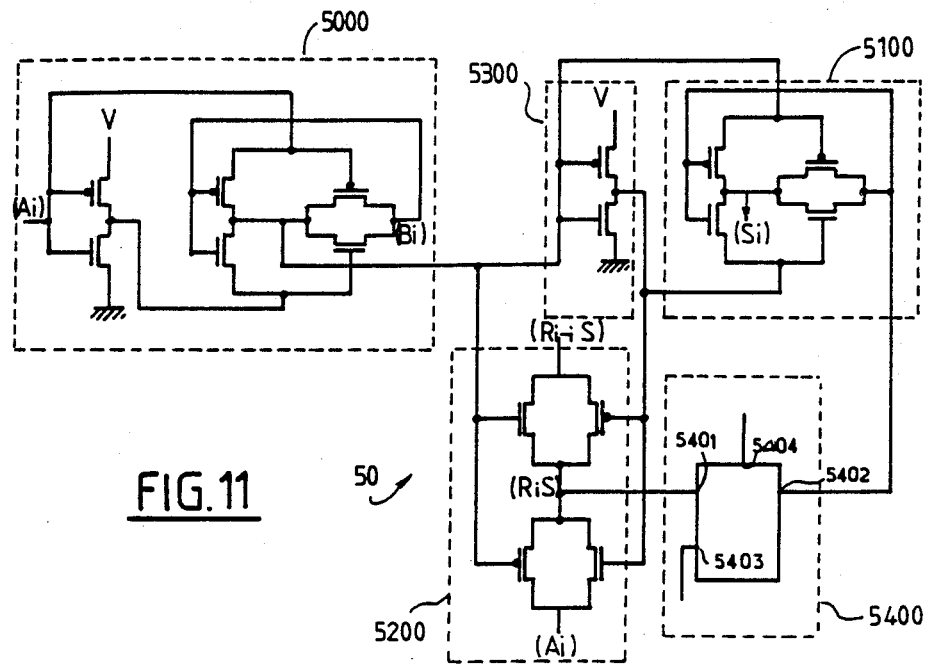
FIG. 11 is a circuit diagram of a full adder in accordance with the invention having three sequential one-bit inputs and comprising 16 transistors.

Reference is now made to FIG. 11 which is a circuit diagram of a one-bit full adder having three sequential inputs and comprising 16 transistors. The adder 50 comprises a module 5000 calculating the two input bit exclusive-OR signal (Ai⊕Bi). It also includes a module 5100 calculating the sum of the two input bits and the carry-in bit (Ri−1 S). It then has a module 5200 calculating the carry-out (Ri S) associated with calculating the sum of the three input bits (Ai), (Bi), and (Ri-1 S). Finally, it includes a module 5300 for inverting the two input bit exclusive-OR signal (Ai⊕Bi) to obtain the complemented two input bit exclusive-OR signal $\overline{(Ai\oplus Bi)}$. A D-type bistable 5400 is interposed between the module 5200 and the module 5100. The data input 5401 of the bistable is connected to the carry-out (Ri S). The output 5402 from the D-type bistable is connected to the carry-in (Ri-1 S). The clock is connected to the clock input 5403 of the bistable, and a bistable initializing signal is applied to input 5404. The bistable described above operates as follows:

When output 5402 of the bistable is initially in the low state, the first clock pulse has the effect of presenting the least significant digits of the binary numbers (Ai) and (Bi) to the adder. The sum (Si) appears at the output from the adder and the carry-out (Ri S) is applied to the D input 5401 of the bistable. At the next clock pulse, the following bits of the binary numbers are presented to the inputs (Ai) and (Bi) of the adder, the preceding sum (Si) is applied to a shift register (not shown), and the preceding carry-out (Ri S) is stored by the bistable and applied to the carry-in input (Ri-1 S) of the adder 50.

Figure 12:
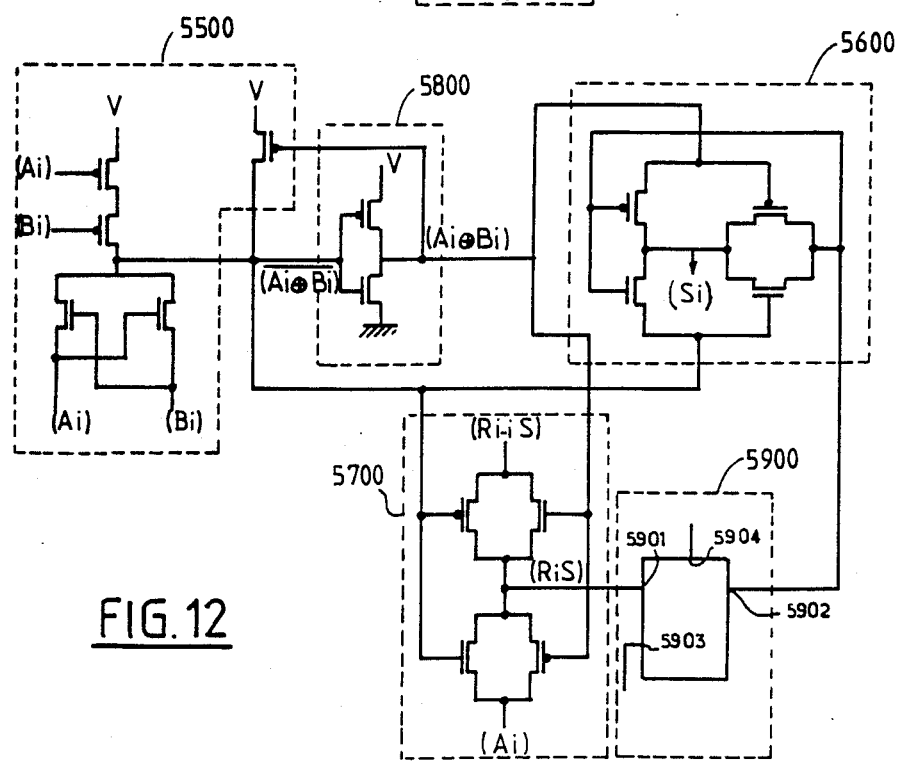
FIG. 12 is a circuit diagram of a full adder in accordance with the invention having three sequential one-bit inputs and comprising 15 transistors.

Reference is now made to FIG. 12 which is a diagram of a three-input sequential adder in accordance with the invention and comprising 15 transistors. The adder 52 includes a module 5500 calculating the complemented two input bit exclusive-OR signal $\overline{(Ai \oplus Bi)}$. It also includes a module 5600 calculating the sum of the three input bits (Ai), (Bi), and (Ri-1 S). It then comprises a module 5700 calculating the carry-out (Ri S) associated with the sum of the two input bits. It then includes a module 5800 inverting the complemented two input bit exclusive-OR signal $\overline{(Ai \oplus Bi)}$ thus obtaining the two input bit exclusive-OR signal (Ai⊕Bi). It finally includes a D-type bistable 5900 whose data input 5901 is connected to the carry-out (Ri S) and whose data (or "Q") output 5902 is connected to the carry-in (Ri-1 S). The clock is connected to the clock input 5903 of the bistable, and the bistable initializing instruction is applied to an input 5904.

Figure 13:
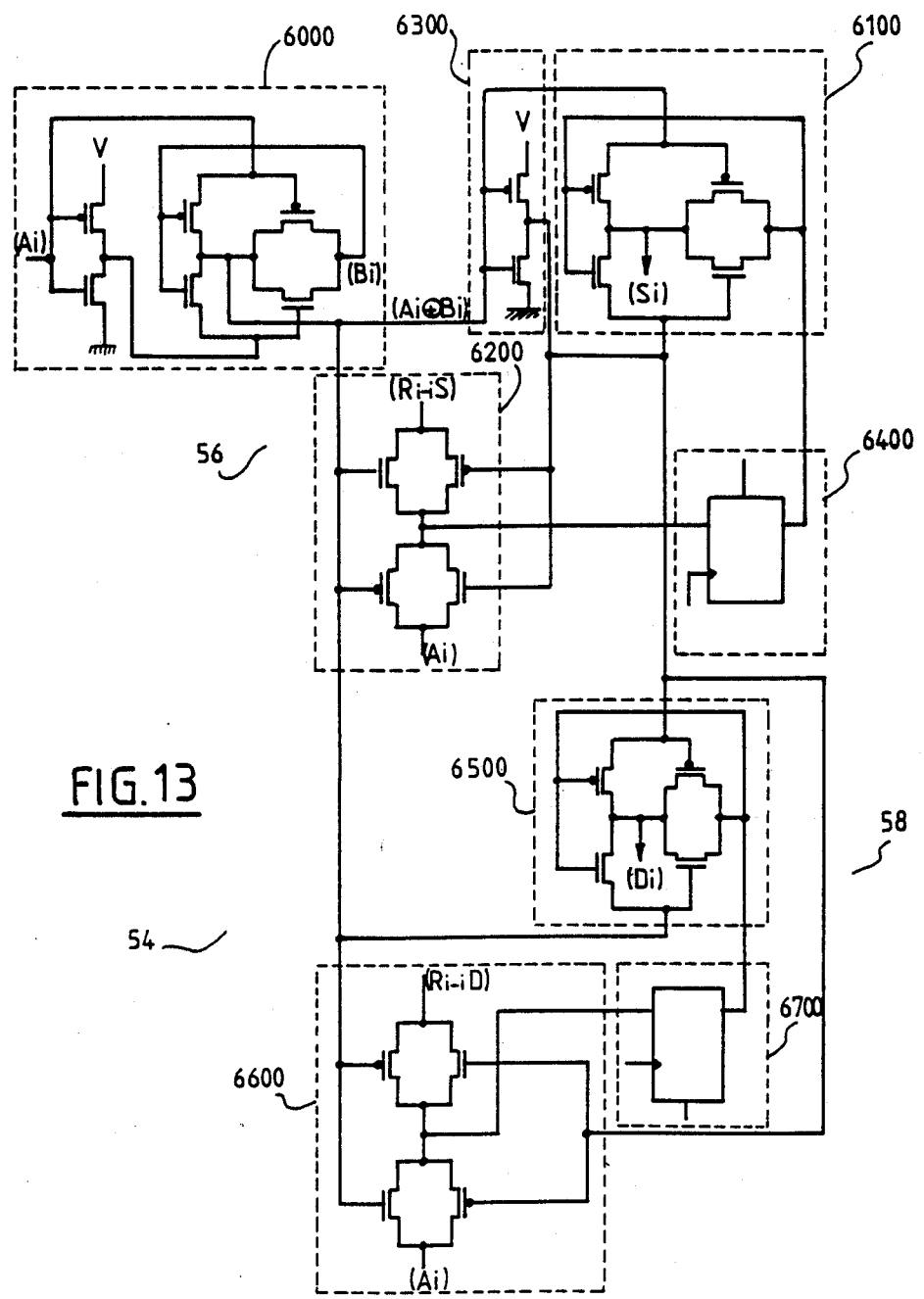
FIG. 13 is a circuit diagram of a full adder-subtractor having four sequential one-bit inputs (Ai), (Bi), (Ri-1 S), and (Ri-1 D), and comprising 24 transistors.

Reference is now made to FIG. 13 which shows a sequential four-input adder-subtractor in accordance with the invention comprising 24 transistors.

The adder-subtractor 54 comprises an adder 56 and a subtractor 58. The adder 56 is identical to the adder 50 described with reference to FIG. 11. The adder 56 includes a module 6000 calculating the two input bit exclusive-OR signal (Ai⊕Bi). The adder 56 further includes a module 6100 calculating the sum of the three input bits (Ai), (Bi), and (Ri-1 S). It also includes a module 6200 calculating the carry-out (Ri s) associated with the sum of the two input bits. It also includes a module 6300 inverting the two input bit exclusive-OR signal (Ai⊕Bi), thereby obtaining the complemented two input bit exclusive-OR signal $\overline{(Ai \oplus Bi)}$. Finally, it includes a bistable 6400 storing the carry-out (Ri S) associated with the sum of the two input bits. The subtractor 58 includes a module 6500 calculating the difference (Di) between the three input bits (Ai), (Bi), and (Ri-1 D). It also includes a module 6600 calculating the carry-out (Ri D) associated with the difference between the two input bits, and it finally includes a bistable 6700 whose date input 6701 is connected to the carry-out (Ri D) associated with the difference between the two input bits, and whose Q output 6702 is connected to the carry-in input (Ri-1 D) associated with the difference between the two input bits.

Figure 14:
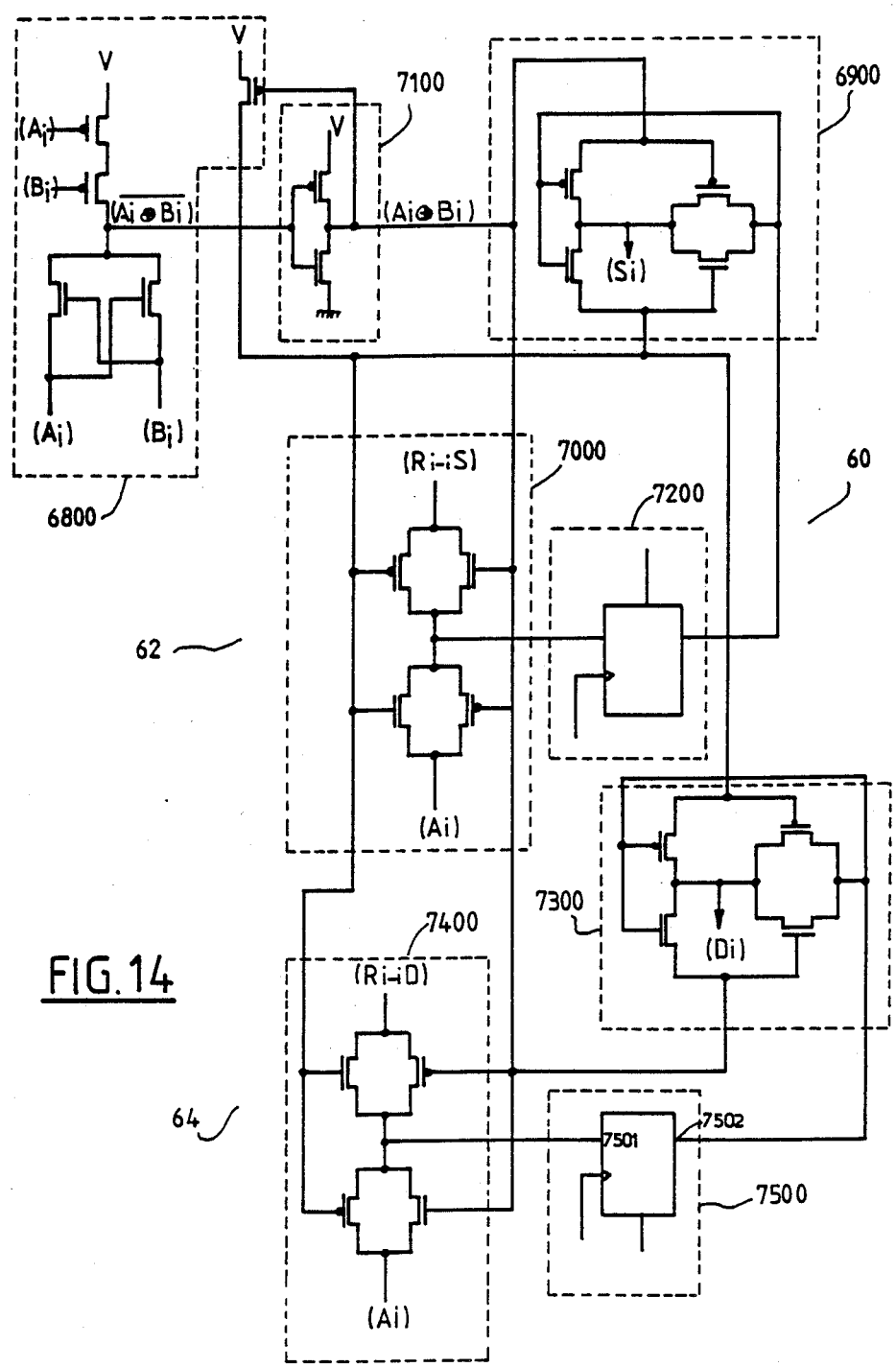
FIG. 14 is a circuit diagram of a full adder-subtractor having four sequential one-bit inputs (Ai), (Bi), (Ri-1 S), and (Ri-1 D), and comprising 23 transistors.

Reference is now made to FIG. 14 which shows a sequential four-input adder-subtractor in accordance with the invention and comprising 23 transistors. The adder-subtractor 60 is constituted by an adder 62 and a subtractor 64. The adder 62 is identical to the adder described with reference to FIG. 12. The adder 63 includes a module 6800 calculating the complemented two input bit exclusive-OR signal (Ai⊕Bi), a module 6900 calculating the sum of the two input bits (Ai), (Bi), and the carry-in bit (Ri-1 S), a module 7000 calculating the carry-out (Ri S) associated with the sum of the two input bits, and inverting module 7100 inverting the complemented two input bit exclusive-OR signal $\overline{(Ai \oplus Bi)}$, thereby obtaining the two input bit exclusive-OR signal (Ai⊕Bi), and a bistable 7200 storing the carry-out (Ri S) associated with the sum of the two input bits.

The subtractor 64 includes a module 7300 calculating the difference (Di) of the three input bits (Ai), (Bi), and (Ri-1 D), a module 7400 calculating the carry-out (Ri D) associated with the difference between the two input bits, and a D-type bistable 7500 whose date input 7501 is connected to the carry-out (Ri D) associated with the difference between the two input bits, and whose Q-output is connected to the carry-in (Ri-1 D) associated with the difference between the two input bits.

It may be observed that the two input bit exclusive-OR signal (Ai⊕Bi) and its complement $\overline{(Ai \oplus Bi)}$ are also required for making a circuit connected in the form of look-ahead carry adders and/or subtractors.

The characteristic which is common to the various variant circuits in accordance with the invention consist in generating the two input bit exclusive-OR signal (Ai⊕Bi) once only and in inverting it by means of a pair of complementary transistors in order to obtain its complement $\overline{(Ai \oplus Bi)}$, and this characteristic can therefore be advantageously applied in the design of multicell circuits organized as look-ahead carry adder and/or subtractor modules.

Another characteristic common to many variants of the circuit of the invention is making common use of the additional outputs provided from the first and second means for conveying signals required by the third means for calculating the carry-out signal (Ri), thereby reducing the number of transistors required.

The invention claimed is:

1. A binary complementary MOS calculation cell, having:
   a first input for receiving a first input bit;
   a second input for receiving a second input bit;
   a third input for receiving a third input bit;
   a first logic operator means comprising:
   (i) a first pair of same polarity transistors forming a series source-to-drain arrangement between a reference voltage terminal and a free drain of one of said transistors, with each of the gates of the transistors of the first pair receiving one of said first and second input bits, said free drain delivering a first intermediate signal, said first intermediate signal being a complemented exclusive-OR function of said first and second input bits;
   (ii) a second pair of same polarity transistors, said polarity being opposite the polarity of the first pair and forming a symmetrical drain-to-gate arrangement, the gate of each transistor of the second pair being connected to the drain of the other transistor of the second pair, with the sources of the second pair being connected to said free drain of said first pair, and each of the drains of the second pair receiving one of said first and second input bits;
   a logic invertor means, connected to said free drain of the first pair, for delivering a second intermediate signal said second intermediate signal being a complement of said first intermediate signal;

a second logic operator means for generating a first output bit, said first output bit being a symmetrical exclusive-OR function of said third input bit and both said first and second intermediate signals;

a third logic operator means for generating a second output bit, said second output bit being a logic symmetrical trigger function representing either a preselected one of said first and second input bits and said third input bit depending upon both said first and second intermediate signals;

a first output for receiving said first output bit; and a second output for receiving said second output bit.

2. A cell according to claim 1, wherein said logic inverter means have a pair of opposite polarity transistors forming a symmetrical drain-to-drain arrangement, the gates of said pair of opposite polarity transistors being connected to said first intermediate signal, and one of the sources of said pair being connected to a reference voltage terminal and the other source of said pair being connected to ground, said drain-to-drain arrangement delivering said second intermediate signal.

3. A cell according to claim 2 wherein said logic inverter means further comprises a single transistor having a source connected to a reference voltage terminal, the gate of said single transistor connected to said second intermediate signal, and the drain of said single transistor connected to said first intermediate signal.

4. A cell according to claim 1, wherein the second logic operator means comprise:
a first pair of opposite polarity transistors forming a symmetrical drain-to-drain arrangement, with the gates of said pair being connected to said third input bit, and one source of said pair being connected to said second intermediate signal and the other source of said pair being connected to said first intermediate signal, said drain-to-drain arrangement delivering said first output bit; and a second pair of opposite polarity transistors forming a symmetrical source-to-drain arrangement and a symmetrical drain-to-source arrangement, with one of the gates of said pair being connected to said second intermediate signal and the other gate of said pair being connected to said first intermediate signal, said source-to-drain arrangement being connected to said third input bit, and said drain-to-source arrangement delivering said first output bit.

5. A cell according to claim 1, wherein the third logic operator means comprise:
a first pair of opposite polarity transistors forming a symmetrical source-to-drain arrangement and a symmetrical drain-to-source arrangement, with one of the gates of said pair being connected to said first intermediate signal and the other gate of said pair being connected to said second intermediate signal, said source-to-drain arrangement being connected to said third input bit, and said drain-to-source arrangement delivering said second input bit; and a second pair of opposite polarity transistors forming a symmetrical source-to-drain arrangement and a symmetrical drain-to-source arrangement, with one of the gates of said pair being connected to said first intermediate signal and the other gate of said pair being connected to said second intermediate signal, said drain-to-source arrangement being connected to a preselected one of said first and second input bits, and said source-to-drain arrangement delivering said second output bit.

6. A binary complementary MOS calculation circuit configured as a ripple carry adder module, said circuit comprising at least a pair of adjacent cells disposed in parallel, the first cell of said pair of adjacent cells having:
a first input for receiving a first input bit;
a second input for receiving a second input bit;
a third input for receiving a carry-in input bit;
a first logic operator means comprising:
(i) a first pair of same polarity transistors forming a series source-to-drain arrangement between a reference voltage terminal and a free drain of one of said transistors, with each of the gates of transistors of the first pair receiving one of said first and second input bits, said free drain delivering a first intermediate signal, said first intermediate signal being the complemented exclusive-OR function of said first and second input bits;
(ii) a second pair of same polarity transistors, said polarity being opposite the polarity of the first pair and forming a symmetrical drain-to-gate arrangement, the gate of each transistor of the second pair being connected to the drain of the other transistor of the second pair with the sources of the transistor of the second pair being connected to the free drain of the first pair, and each of the drains of the transistors of the second pair receiving one of the first and second input bits;
(iii) a logic inverter means, connected to said free drain of the first pair, for delivering a second intermediate signal, said second intermediate signal being a complement of said first intermediate signal;
a second logic operator means for generating a result output bit, said result output bit being the symmetrical exclusive-OR function of said third input bit and both said first and second intermediate signal;
a third logic operator means for generating a carry-out output bit, said carry-out bit being a logic symmetrical trigger function representing either a preselected one of said first and second input bits and said third input bit depending upon both said first and second intermediate signals;
a first output for receiving said result output bit;
a second output for receiving said carry-out output bit;
a logic invertor means connected to said second output bit, for delivering a complement of said second output bit; and
means for applying said complemented second output bit to the second cell of said pair of adjacent cells;
said second cell having:
a first input for receiving a first input bit;
a second input for receiving a second input bit;
a third input for receiving said complemented second output bit of said first cell;
first logic operator means comprising:
(i) a first pair of same polarity transistors forming series source-to-drain arrangement between a reference voltage terminal and a free drain of one of said transistors, with each of the gates of the transistors of the first pair receiving one of said first and second input bits, said free drain delivering a first intermediate signal, said intermediate signal being the complemented exclusive-OR function of said first and second input bits;

(ii) a second pair of same polarity transistors, said polarity being opposite the polarity of the second pair and forming a symmetrical drain-to-gate arrangement, the gate of each transistor of the second pair being connected to the drain of the other transistor of the second pair, with the sources of the transistors of the second pair being connected to said free drain of said first pair, and each of the drains of the transistors of the second pair receiving one of said first and second input bits;

(iii) a logic inverter means, connected to said free drain of said first pair, for delivering a second intermediate signal, said second intermediate signal being a complement of said first intermediate signal;

second logic operator means for generating a result output bit, said result output bit being the symmetrical exclusive-OR function of said third input bit and both said first and second intermediate signals;

third logic operator means for generating a carry-out output bit being a logic symmetrical trigger function representing either a preselected one of said first and second input bits and said third input bit depending upon both said first and second intermediate signals;

a first output for receiving said result output bit;

a second output for receiving said carry-out output bit.

7. A binary complementary MOS calculation cell, having:

a first input for receiving a first input bit presented sequentially in series to said first input;

a second input for receiving a second input bit presented sequentially in series to said second input;

a storing means for storing a precedent carry/borrow bit;

a first logic operator means comprising:

(i) a first pair of same polarity transistors forming a series source-to-drain arrangement between a reference voltage terminal and a free drain of one of said transistors, with each of the gates of the transistors of said first pair receiving one of said first and second input bits, said free drain delivering a first intermediate signal being the complemented exclusive-OR function of said first and second input bits;

(ii) a second pair of same polarity transistors, the polarity of said second pair being opposite the polarity of the first pair, the second pair forming a symmetrical drain-to-gate arrangement, the gate of each transistor of the second pair being connected to the drain of the other transistor of the second pair, with the sources of the second being connected to said free drain of said first pair, and each of the drains of the second pair receiving one of said first and second input bits;

(iii) a logic invertor means connected to said free drain of the first pair, for delivering a second intermediate signal being the complement of said first intermediate signal;

second logic operator means for generating an output bit, said output bit being a symmetrical exclusive-OR function of said precedent carry/borrow bit and both said first and second intermediate signals;

third logic operator means for generating a current carry/borrow bit being a logic symmetrical trigger function representing either a preselected one of said first and second input bits and said precedent carry/borrow input bit depending upon both said first and second intermediate signals;

means for applying said current carry/borrow bit to said storing means; and an output receiving said output bit.

8. A cell according to claim 7, wherein said storing means comprise a D-type bistable with the second output bit being connected to a D-input of the bistable and with the third input bit being connected to a Q-output from the bistable.

9. A binary complementary MOS calculation circuit, having:

a first input for receiving a first input bit;

a second input for receiving a second input bit;

a third input for receiving a carry-in input bit;

a fourth input for receiving a borrow-in input bit;

a first logic operator means for generating a first intermediate signal, said first intermediate signal being the exclusive-OR function of said first and second input bits, and a second intermediate signal being the complement of said first intermediate signal;

second logic operator means for generating a sum output bit, said sum output being the symmetrical exclusive-OR function of said third input bit and both said first and second intermediate signals;

third logic operator means for generating a difference output bit, said difference output bit being the symmetrical exclusive-OR function of said fourth input bit and both said first and second intermediate signals;

fourth logic operator means for generating a carry-out bit, said carry-out output bit being a logic symmetrical trigger function representing either a preselected one of said first and second input bits and said third input bit depending upon both said first and second intermediate signals;

fifth logic operator means for generating a borrow-out bit, said borrow-out output bit being a logic symmetrical trigger function representing either a preselected one of said first and second input bits and said fourth input bit depending upon both said first and second intermediate signals;

a first output for receiving said sum output bit;

a second output for receiving said difference output bit;

a third output for receiving a carry-out output bit;

a fourth output for receiving a borrow-out output bit;

thereby said calculation circuit forming both an addition cell and a subtraction cell with a restricted number of logic elements.

10. A circuit according to claim 9, wherein said first logic operator means comprise:

a first pair of same polarity transistors forming a series source-to-drain arrangement between a reference voltage terminal and a free drain of one of said transistors, with each of the gates of said transistors of said first pair receiving one of said first and second input bits, said free drain delivering a first intermediate signal being the complemented exclusive-OR function of said first and second input bits;

a second pair of same polarity transistors, the polarity of said second pair opposite the polarity of the first pair, forming a symmetrical drain-to-gate arrangement, the gate of each transistor of the second pair being connected to the drain of the other transistor of the second pair, with the sources of the second pair being connected to said free drain of said first pair, and each of the drains of the second pair receiving one of said first and second input bits;

a logic invertor means, connected to said free drain of the first pair, for delivering a second intermediate signal being the complement of said first intermediate signal.

11. A circuit according to claim 9, wherein said logic inverter means have a pair of opposite polarity transistors forming a symmetrical drain-to-drain arrangement, with the gates of said pair of opposite polarity transistors in said logic inverter means being connected to said first intermediate signal, and one of the sources of said pair in said logic inverter means being connected to a reference voltage terminal and the other source of said pair connected to ground, said drain-to-drain arrangement delivering said second intermediate signal.

12. A circuit according to claim 11, wherein said logic inverter means further comprise a single transistor having a source connected to a reference voltage terminal, a gate connected to said first intermediate signal.

* * * * *